United States Patent [19]

Ho et al.

[11] 4,237,504
[45] Dec. 2, 1980

[54] LINEAR ACTUATOR INCLUDING LIMIT STOP ASSEMBLY FOR MAGNETIC DISC DRIVE

[75] Inventors: Bin L. Ho, Los Gatos; Albert Guerini, Gilroy, both of Calif.

[73] Assignee: Priam, Cupertino, Calif.

[21] Appl. No.: 6,777

[22] Filed: Jan. 26, 1979

[51] Int. Cl.$^2$ .................... G11B 21/08; G05G 5/06
[52] U.S. Cl. .................................... 360/106; 74/526
[58] Field of Search ............... 360/106; 310/12–14; 74/526

[56] References Cited

U.S. PATENT DOCUMENTS

| | | | |
|---|---|---|---|
| 3,631,419 | 12/1971 | Ho ........................................ | 360/106 |
| 3,643,242 | 2/1972 | Bryer ................................... | 360/106 |
| 4,110,802 | 8/1978 | Ho et al. .............................. | 360/106 |

OTHER PUBLICATIONS

Borg et al., "Bidirectional . . . Assembly", IBM Tech. Disc. Bull., vol. 21, No. 1, Jun., 1978, p. 312.

*Primary Examiner*—Robert S. Tupper
*Attorney, Agent, or Firm*—Flehr, Hohbach, Test

[57] ABSTRACT

A limit stop assembly for use with a linear actuator in a sealed magnetic disc drive which establishes inner and outer limits of travel and provides shock absorption for the pickup heads and carriage at the limits of travel. The assembly is mounted on an adjustable seat in a wall of the actuator. A first stop member is threadably attached to the seat, a second stop member is positioned about the first member, and a spring yieldably biases the second stop member away from the stop surface of the first member. A cup shaped member is positioned about the stop surface of the first member and is yieldably biased by the spring. The first stop member extends through a hole in the second stop member, and a shoulder of the first member limits the travel of the second stop member. Adjustment of the stop positions is accomplished by movement of the seat and the first member within the seat.

19 Claims, 3 Drawing Figures

U.S. Patent　　Dec. 2, 1980　　4,237,504
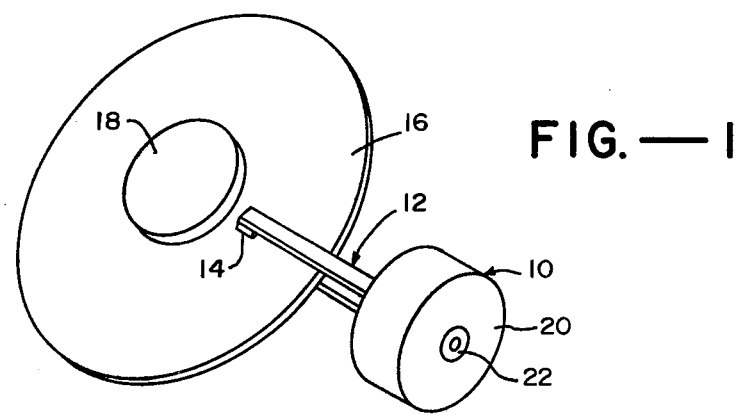
FIG.—1
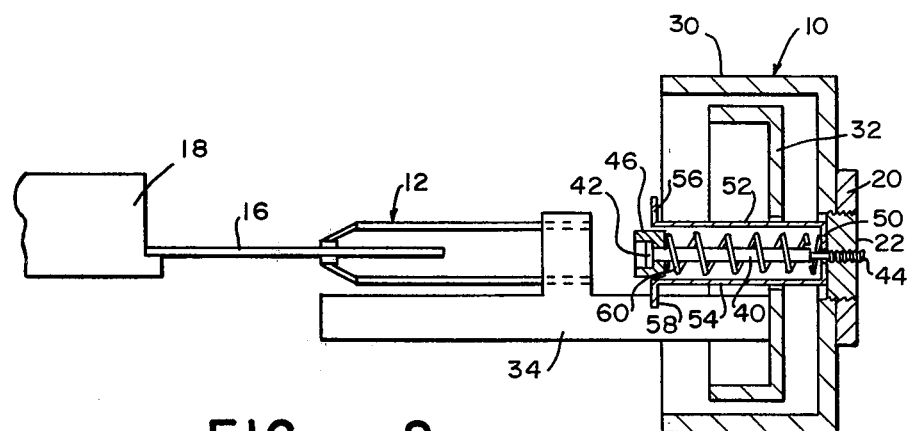
FIG.—2
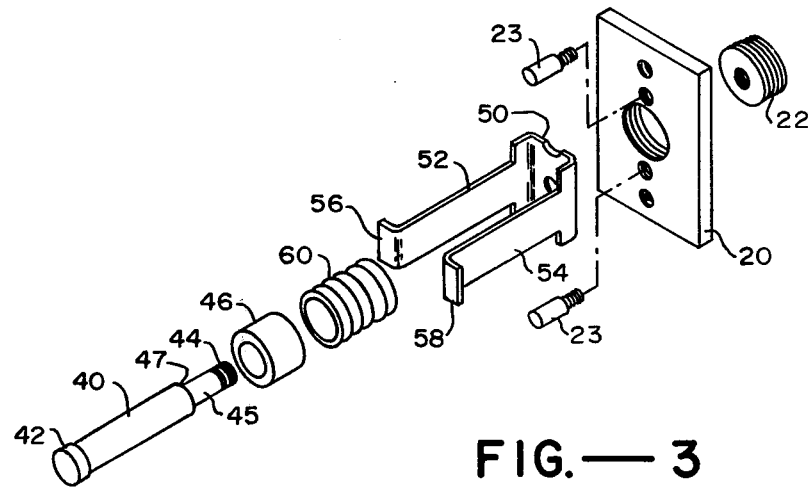
FIG.—3

LINEAR ACTUATOR INCLUDING LIMIT STOP ASSEMBLY FOR MAGNETIC DISC DRIVE

This patent application is related to the following copending applications: "LINEAR ACTUATOR FOR MAGNETIC DISC DRIVE", Ho and Dong, Ser. No. 006,775, filed Jan. 26, 1979; "ENCLOSED DISC DRIVE WITH IMPROVED AIR FLOW", Ho and Bibby, Ser. No. 006,776, filed Jan. 26, 1979; and "MANUFACTURING FIXTURE AND SUPPORT FOR MAGNETIC DISC", Ho and Guerini, Ser. No. 006,861, filed Jan. 26, 1979.

This invention relates generally to linear actuators such as used in magnetic disc drives, and more particularly the invention relates to a linear actuator and limit stop assembly for limiting travel of a pickup head and carriage assembly and for providing shock absorption at the limits of travel.

Discs having magnetic coatings on the surfaces thereof provide memories for bits of data which can be randomly accessed at high speed for either retrieving or storing data. Typically, heads having a small coil are moved across the disc surfaces while the disc is spinning for detecting or storing data in concentric data tracks on the disc surfaces. The heads ride on a thin layer of air created by the spinning disc with the heads in close proximity to but spaced from the disc surface.

To alleviate problems of contamination and alignment of read/write heads, sealed disc drives have been introduced. These units include read/write heads and carriage, linear actuator for the carriage, drive motor and spindle, and magnetic discs which are sealed in a housing. Air from outside the sealed housing passes through a breather filter in the housing, and air flow within the sealed housing created by the spindle and disc rotation is also filtered.

The pickup head and carrier assembly is driven by a linear actuator including a voice coil assembly. Conventionally, a crash stop mechanism is provided in the linear actuator to limit the travel of the magnetic head assembly and prevent crashes of the pickup head with the spinndle at the inner radius of the disc and to prevent the heads from falling off the outer edge of the magnetic disc. A shock absorption mechanism must be provided within the linear actuator to absorb the shock of fast moving head carriage as it engages the limit stops. Additionally, the limit stop assembly must provide accurate positioning of the pickup heads above inner and outer guard bands on the magnetic disc to generate requisite control signals for the servo system control of the heads. If alignment of the heads is out of adjustment and the heads do not see the prerecorded servo data or guard bands, the disc drive will be non-operational. Since the linear actuator and crash stop are assembled as a unit, their constituent parts must be manufactured to close tolerances to assure proper performance in field use. Considerable time can be expended in proper adjustment of the crash stop assembly and linear actuator during assembly, and a non-operational disc drive in the field may require return to the factory for readjustment.

An object of the present invention is an improved linear actuator and limit stop assembly.

Another object of the invention is a limit stop assembly for a magnetic head carriage in a linear actuator which is readily adjustable.

Still another object of the invention is a limit stop assembly which provides shock absorption for a pickup assembly.

Yet another object of the invention is a limit stop assembly which is economical in construction.

Briefly, in accordance with the invention, a limit stop assembly comprises a first stationary elongated stop member including an enlarged head portion which provides a first stop surface for limiting travel of a linear actuator in one direction, a moveable second stop member for limiting travel of the linear actuator in the opposite direction, and spring means for yieldably biasing the moveable stop member away from the first stop member which has an externally threaded surface for mating with a threaded hole in a support plate of the linear actuator and an internally threaded hole for receiving a threaded portion of the first stop member, whereby the limit of travel of a pickup carriage can be varied by relative movement of the threaded portion of the first stop member and the adjustable seat.

A cup shaped member is slideably mounted on the first stop member and has an open end and a closed end with the cup portion being of sufficient size to receive the enlarged head portion of the first stop member. The closed portion has an opening therethrough for receiving the body portion of the first stop member whereby travel of the cup shaped member on the inner stop member is limited by the enlarged head portion.

The second stop member further includes a generally planar central portion having an opening for receiving the first stop member and having a plurality of fingers extending from the central portion in generally parallel alignment with the first stop member, each of the fingers including a stop surface extending generally perpendicular to the finger.

Spring means is positioned about the first stop member yieldably biasing the cup shaped member into engagement with the enlarged head portion and yieldably biasing the second stop member away from the cup shaped member.

Preferably, the first stop member includes a portion of reduced cross section, with the opening in the central portion of the second stop member accommodating only the portion of reduced cross section whereby the second stop member can travel only the length of the portion of the first stop member having reduced cross section.

The invention and objects and features thereof will be more readily apparent from the following detailed description and appended claims when taken with the drawing.

In the drawing, FIG. 1 is a perspective view illustrating a linear actuator and pickup head carriage assembly with a magnetic disc.

FIG. 2 is a side view partially in section of one embodiment of a linear actuator and limit stop assembly in accordance with the present invention.

FIG. 3 is an exploded perspective view of the limit stop assembly of FIG. 2.

Referring now to the drawing, FIG. 1 is a perspective view illustrating a linear actuator 10 and carriage 12 for moving magnetic heads 14 across the surface of a magnetic disc 16 for retrieving and storing data thereon. The disc 16 is mounted on a spindle 18 and is rotated by a drive motor as the pickup head 14 reads and records data. The disc, spindle, drive motor, and linear actuator are assembled in one unit with the disc sealed to prevent contamination of the magnetic heads and disc surfaces.

The linear actuator is normally provided with limit stops for preventing the heads from crashing into the spindle 18 or from falling off from the edge of the disc 16. Moreover, the limit stops must be accurately positioned so that the heads 14 are positioned over guard bands on the disc surfaces at the inner and outer limits of travel of the heads so that control data in the guard bands is received by the servo drive which controls the linear actuator. Stored data on the surface of the disc lies between the two guard bands.

The limit stop mechanism must not only limit travel of the magnetic head carriage but must also serve as a shock absorber in the event that the servo system malfunctions and sends the heads at full speed towards the spindle hub or pulls the heads towards the edge of the disc. Advantageously, the limit stop assembly should be easily adjusted so that the heads can be properly positioned over the inner and outer guard bands at the limits of travel of the carriage assembly.

In accordance with the present invention the linear actuator 10 is provided with an improved limit stop assembly which can be readily attached to plate 20 at the end of the linear actuator. Alternatively, the assembly can be attached directly to the wall of the linear actuator. FIG. 2 is a side view partially in section of the linear actuator 10 and illustrates one embodiment of a limit stop assembly in accordance with the invention. FIG. 3 is an exploded perspective view of the limit stop assembly and like elements have the same reference numerals in FIGS. 2 and 3.

The linear actuator 10 may be of the type disclosed in copending application Ser. No. 006,775 and includes an outer cylindrical housing 30 with permanent magnets (not shown) attached to the interior surface of the housing. A voice coil and bobbin assembly shown generally at 32 is mounted within housing 10 with the voice coil in close proximity to the magnets with the bobbin being linearly driven in response to energization of the voice coil. The magnetic head assembly 12 includes a support 34 which is attached to bobbin 32 and is linearly driven by movement of bobbin 32. For illustration purposes only a portion of the housing 30 and bobbin 32 is shown in FIG. 2.

The limit stop assembly is provided within linear actuator 10 and the seat 22 of the assembly is supported by plate 20 and limits the travel of the pickup head assembly 12 and bobbin 32. Plate 20 can be fastened to the end portion of housing 10 by means of fasteners 23, or alternatively plate 20 may comprise part of the end portion of housing 10. The limit stop assembly includes an elongated first stop member 40 having an enlarged head portion 42 on one end and a threaded surface 44 on the other end. The threaded portion 44 is received by a threaded hole in seat 22, and adjustment of the limit stop assembly is effected by relative movement of threaded portion 44 and seat 22. A portion 45 of the first stop member has a reduced cross-sectional area which defines a shoulder 47.

Mounted on one end of the first stop member 40 is a cup shaped member 46 having an open end and a closed end with the cup portion being of sufficient size to receive the enlarged head portion 42 of the inner stop member and with the closed end having an opening therethrough for receiving the body portion of the first stop member whereby the cup shaped member is slideably mounted on the first stop member with the enlarged head portion limiting travel thereof.

A second stop member is provided about the first stop member and includes a generally planar central portion 50 which has an opening for receiving portion 45 of the first stop member with a plurality of fingers 52 and 54 extending from the central portion 50 in generally parallel alignment with the first stop member. Fingers 52 and 54 include stop surfaces 56 and 58, respectively, which extend generally perpendicular to the fingers.

A spring 60 is mounted about the first stop member 40 and within the fingers 52, 54 of second stop member and yieldably biases the cup shaped member 46 into engagement with the enlarged head portion 42, and yieldably biases the second stop member away from member 46.

In operation, inward movement of the pickup head carriage assembly 12 is limited by bobbin 32 engaging the stop surfaces 56 and 58 of the second stop member. Shock absorption is provided by compression of spring 60 with an absolute travel limit established by the central portion 50 engaging shoulder 47 of the first stop member. Outward movement of the pickup head carriage assembly 12 is limited by support 34 engaging the cup shaped member 46. Shock absorption is provided by member 46 compressing spring 60, with an absolute travel stop provided by the enlarged portion 42 of the first stop member 40.

Advantageously, the position of the stop surfaces 56 and 58 within the linear actuator can be varied by adjustment of seat 22 in end plate 20. The relative position of the stop surface of portion 42 on first stop member 40 is established by movement of threaded portion 44 within seat 22. Thus, positioning of the pickup heads can be readily adjusted in the factory and in the field by relative movement of seat 22 and the threaded portion 44 of the first stop member to provide proper alignment of the pickup heads above the guard bands on the disc surface. The thread pitches for both external and internal threads are identical. Thus, turning of seat 22 while keeping stop member 40 stationary will move only the second stop member.

A limit stop assembly in accordance with the present invention is relatively simple and inexpensive to manufacture and is readily adjusted in factory assembly and in field use. While the invention has been described with reference to a specific embodiment, the description is illustrative of the invention and is not to be constructed as limiting the invention. Various modifications and applications may occur to those skilled in the art without departing from the true spirit and scope of the invention as defined by the appended claims.

What is claimed is:

1. A limit stop assembly for use with linear actuator means to limit linear travel of a carriage assembly of said linear actuator means comprising
   an elongated first stop member axially aligned with the linear travel of said carriage assembly and having an enlarged head portion on one end and a threaded portion on the other end,
   an adjustable seat having an externally threaded surface for mating with a support plate of the linear actuator means and an internally threaded surface for receiving said threaded portion of said first stop member,
   a cup shaped member having an open end and a partially closed end with the cup portion being of sufficient size to receive said enlarged head portion of said first stop member and said partially closed portion having an opening therethrough for receiving the body portion of said first stop member whereby said cup shaped member is slideably mounted on said first stop member with said enlarged head portion limiting travel thereof, a second stop member including a generally planar central portion having an opening for receiving said first stop member and a plurality of fingers extending from said central portion in generally parallel alignment with said first stop member, each of said fingers including a stop surface extending generally perpendicular to said finger, and spring means positioned about said first stop member yieldably biasing said cup shaped member into engagement with said enlarged head portion and yieldably biasing said second stop member away from said cup shaped member whereby travel of said carriage assembly is limited in one direction when said carriage assembly engages said cup shaped member and said enlarged head and travel of said carriage assembly is limited in an opposite direction when said carriage assembly engages said stop surfaces of said fingers.

2. A limit stop assembly as defined by claim 1 wherein said cup portion of said cup shaped member has a depth which is greater than the length of said enlarged head portion whereby the linear actuator means can engage and move said cup shaped member before engaging said head portion of said inner stop member.

3. A limit stop assembly as defined by claim 2 wherein the carriage assembly can move laterally with respect to said limit stop assembly a predetermined distance before engaging said cup shaped member or said stop surfaces of said plurality of fingers.

4. A limit stop assembly as defined by claim 3 wherein said predetermined distance can be varied by relative movement of said threaded portion of said first stop member and said adjustable seat.

5. A limit stop assembly as defined by claim 3 wherein said first stop member includes a portion of reduced cross-section, said opening in said central portion of said second stop member accommodating only said portion of reduced cross-section whereby said second stop member can travel only the length of said portion of reduced cross-section.

6. A limit stop assembly as defined by claim 1 wherein said first stop member includes a portion of reduced cross-section, said opening in said central portion of said second stop member accommodating only said portion of reduced cross-section whereby said second stop member can travel only the length of said portion of reduced cross-section.

7. A linear actuator for a magnetic disc and the like comprising a cylindrical housing, a plurality of magnets mounted on an inner surface of said cylindrical housing, a voice coil and bobbin linearly moveably positioned within said housing with said voice coil in close proximity to said magnets, a magnetic head carriage mounted to said bobbin and linearly moveable with respect to the surface of a disc, and a limit stop assembly mounted to said housing and limiting the linear travel of said bobbin and said carriage, said limit stop assembly including a stationary elongated first stop member axially aligned with the linear travel of said bobbin and carriage and including a first stop surface for limiting travel of said bobbin and carriage in one direction, a moveable second stop member mounted about said first stop member and having a second stop surface for limiting travel of said bobbin and carriage in the opposite direction, and spring means for yieldably biasing said second stop surface of said moveable stop member away from said first stop surface of said first stop member.

8. A linear actuator as defined by claim 7 wherein said second stop member includes a generally planar central portion having an opening for receiving said first stop member, said spring means being positioned between said generally planar central portion and said first stop surface.

9. A linear actuator as defined by claim 8 wherein said first stop member includes a portion of reduced cross-section, said opening in said central portion of said second stop member accommodating only said portion of reduced cross-section whereby said second stop member can travel only the length of said portion of reduced cross-section.

10. A linear actuator as defined by claim 8 wherein said second stop member further includes a plurality of fingers extending from said central portion towards said first stop surface, each of said fingers including a stop surface extending generally perpendicular to said finger.

11. A linear actuator as defined by claim 10 wherein said limit stop assembly further includes an adjustable seat having an externally threaded surface for mating with a threaded hole in a support plate of the linear actuator means and an internally threaded hole for threadably receiving said first stop member.

12. A linear actuator as defined by claim 11 and further including a cup shaped member having an open end and a partially closed end with said cup portion being of sufficient size to receive said enlarged head portion of said first stop member and said partially closed portion having an opening therethrough for receiving the body portion of said first stop member whereby said cup member is slideably mounted on said first stop member with the enlarged head portion limiting travel thereof.

13. A linear actuator as defined by claim 7 and further including an adjustable seat having an externally threaded surface for mating with a threaded hole in the support plate of the linear actuator and an internally threaded hole for threadably receiving said first stop member.

14. A limit stop assembly for use with a magnetic disc drive linear actuator and the like for limiting the linear travel of said actuator comprising a stationary elongated first stop member axially aligned with the linear travel of said actuator and including on one end thereof a first stop surface for limiting travel of said linear actuator in one direction, a moveable stop member mounted about said first stop member for limiting travel of said linear actuator in the opposite direction, and spring means for yieldably biasing said moveable stop member away from said first stop member.

15. A limit stop assembly as defined by claim 14 wherein said first stop member includes a threaded surface on the opposite end from said first stop surface and further including an adjustable seat having an externally threaded surface for mating with a threaded hole in a fixed wall of the linear actuator and an internally threaded surface for receiving said threaded portion of said first stop member.

16. A limit stop assembly as defined by claim 15 and further including a cup shaped member having an open end and a closed end with the cup portion being of sufficient size to receive said enlarged head portion of said first stop member and said closed portion having an opening therethrough for receiving the body portion of said first stop member whereby said cup member is slideably mounted on said elongated inner stop member with said enlarged head portion limiting travel thereof.

17. A limit stop assembly as defined by claim 16 wherein said cup portion of said cup shaped member has a depth which is greater than the length of said enlarged head portion whereby linear actuator means can engage and move said cup shaped member before engaging said head portion of said first stop member.

18. A linear stop assembly as defined by claim 16 wherein said second stop member includes a generally planar central portion having an opening for receiving said elongated inner stop member and a plurality of fingers extending from said central portion in generally parallel alignment with said elongated inner stop member, each of said fingers including a stop surface extending generally perpendicular to said finger.

19. A linear stop assembly as defined by claim 18 wherein said first stop member includes a portion of reduced cross-section, said opening in said central portion of said second stop member accommodating only said portion of reduced cross-section whereby said second stop member can travel only the length of said portion of reduced cross-section.

* * * * *